United States Patent Office 3,208,937
Patented Sept. 28, 1965

3,208,937
PROCESS FOR OBTAINING SILICEOUS AMINO COMPOUNDS
Frederick J. Ihde, Jr., Mountain Lakes, James J. Bayone, Bloomfield, and Arthur D. Lahr, Elizabeth, N.J., assignors to Nopco Chemical Company, Newark, N.J., a corporation of New Jersey
No Drawing. Filed Mar. 2, 1962, Ser. No. 176,911
8 Claims. (Cl. 252—28)

This invention relates to an improved process for obtaining siliceous amino compounds. More particularly, this invention relates to a process for preparing gels of siliceous amino compounds so as to obtain a product having a fine particle size as well as a large surface area.

Siliceous amino compounds have been defined in U.S. Patent No. 2,967,828, Ihde, January 10, 1961, as the reaction product of partial amide salts with water soluble silicate salts in which the silicate salts are present in amounts sufficient to react with all of the acidic components of the partial amide salt so as to form a gel or sol. If the silicate salt is present in greater than the aforementioned amount, said amount hereafter being referred to as a stoichiometric amount, then after reaction between the partial amide salt and the silicate salt, the excess silicate salt may then be converted to silicon dioxide by treatment with an acid, and the siliceous amino compound may then be adsorbed or complexed upon the surface of the silicon dioxide. The formation of a particular siliceous amino compound having a particular structure and/or particle size is dependent upon the control of the particular reactants, reaction and conditions utilized during the formation of the siliceous amino compound. Any slight variation of the reactants, the reaction or the conditions of the reaction will produce a different siliceous amino compound having a unique structure and/or a unique particle size.

These siliceous amino compounds are all characterized by the unique and unexpected property, that when they are added to certain materials such as oils, paints, solvents, etc., the viscosity of these materials is greatly increased, and this increased viscosity is maintained even at elevated temperatures. Also, the addition of siliceous amino compounds gives these materials the additional advantage of having lower penetration values even at elevated temperatures. These unique advantages make these compounds extremely useful as thickeners, for such products as oils, solvents, paints, adhesives, etc. In utilizing these compounds as thickeners for the above materials, it is important that only a small amount of these siliceous amino compounds be required to give increased thickening properties to the aforementioned materials. This is true, since in most cases, excessive dilutions of the above materials result in decreased effectiveness of these materials even though thickening is accomplished.

While the previous siliceous amino compounds have been effective as thickening agents for oils, paints and lubricants, etc., excessive quantities of these thickening agents had to be used to effect the requisite amount of thickening of oils, lubricants, solvents, greases etc. By use of excessive amounts of this thickener, a dilution in the beneficial properties of the lubricants, oils, paints, etc. were produced.

S.N. 107,320, filed May 3, 1961, now U.S. Patent No. 3,129,178, April 14, 1964, discloses and claims a method of preparing siliceous amino compounds wherein isophthalic acid, terephthalic acid and salts thereof are utilized in the process of preparing the siliceous amino compounds. While the siliceous amino compounds prepared by this process have been effective in preventing materials such as greases and oils from bleeding and have provided enhanced thickening properties for materials, such as oil, greases, solvents, etc., it is still necessary to utilize large amounts of the siliceous amino compound prepared by the method of U.S. Patent No. 3,129,178 to provide the requisite thickening and bodying action for many materials. In many cases, by utilizing large amounts of the thickener of U.S. Patent No. 3,129,178, the effectiveness of the material to be thickened was reduced due to the dilution of the aforementioned materials with this thickener. The disclosure in U.S. Patent No. 3,129,178, is hereby incorporated into the present application by reference.

An object of this invention is to provide new siliceous amino compounds.

A further object of this invention is to provide a new siliceous amino compound that has greater thickening properties for such materials as oils, lubricants, solvents, greases, etc. than other known siliceous amino compounds.

A further object of this invention is to provide an improved method for preparing siliceous amino compounds.

A further object of this invention is to provide siliceous amino compounds having fine particle sizes as well as large surface areas.

Another object of this invention is to provide a siliceous amino compound that will give maximum thickening and bodying action to various material such as greases, oils, paints, solvents, etc., even when utilized in small amounts.

Other objects and advantages will become apparent from the following more complete description and claims.

In the process of preparing siliceous amino compounds by preparing a silica gel or sol by reacting a water soluble silicate salt and an acid and thereafter reacting a partial amide salt with a water soluble silicate salt in the presence of said silica sol or gel, we have unexpectedly discovered that by allowing the sol or gel to digest for a period of from 0.5 to 5 hours at a temperature of from about 20° C. to 40° C. and thereafter heat treating this sol or gel for a period of from 0.5 to 4 hours at a temperature of from 40° C. to 75° C. before the addition of the partial amide salt and the water soluble silicate salt into the silica sol or gel, a siliceous amino compound is formed having very small and fine particle sizes arranged in a coacervated structure as well as a large surface area and which has a greater thickening and bodying action for materials such as oils, adhesives, lubricants, etc. without excessively diluting the effectiveness of these materials than other known siliceous amino compounds.

In order to produce the siliceous amino compounds of this invention having the desired thickening properties, the gel or sol should comprise 65% to 95% by weight of the final product whereas the reaction product of the partial amide salt with the water soluble silicate salts should constitute 5% to 35% by weight of the final product.

The phenomena whereby increased and improved thickening and bodying action by use of the siliceous amino compound of this invention is achieved, is not completely understood, however, it is believed that these properties are in general attributable to the coacervated structure and particle size of the particular siliceous amino compounds prepared in accordance with the teachings of this invention. By utilizing the process of this invention siliceous amino compounds are produced that have fine particle sizes producing a large surface area. For the purpose of thickening such materials as paints, lubricants, oils, solvents, adhesives, etc., the siliceous amino compounds of this invention have a thickening power of at least about twice as great as that of any of the other known siliceous amino compounds. Hence only about at most one-half the amount of siliceous amino compounds prepared in accordance with this invention need be used to produce a given thickening within an oil, grease, paint, etc., as compared to the other known siliceous amino thickeners, reducing the dilution effect of thickeners upon the aforementioned materials. The siliceous amino compounds of this invention also impart to these materials greater bodying and lower penetration values. The lower penetration value is particularly valuable in the use of adhesives for uniting two surfaces. By using the siliceous amino compound of this invention within an adhesive, the adhesive is prevented from penetrating excessively into any of the adhered surfaces so as to weaken the adhesion of the surfaces and in some cases destroy the effectiveness of the adhesive.

PREFERRED EMBODIMENT

This invention is preferably practiced in the following manner.

A silica gel or sol is prepared by dissolving or dispersing in water, a water insoluble aromatic acid such as isophthalic acid and sodium silicate. When this is done, a portion of the sodium silicate will react with substantially all of the aromatic acid to form a slurry of water soluble sodium salt of the aromatic acid and large particles of silica. The formation of large silica particles in the substrate formed in this stage of the preparation results in the production of fine silica particles when the bulk of the sodium silicate is later converted to the gel or the sol.

A solution of water soluble magnesium salts such as magnesium sulfate may then be added to the slurry. By the addition of magnesium sulfate to the slurry, the bulk of water soluble sodium salt of the aromatic acid is converted to the water soluble magnesium salt of the aromatic acid. A solution of sodium fluosilicate is then added to the slurry. Sulfuric acid and sodium silicate are slowly added at the same time to the reaction slurry. The slurry is constantly agitated during the addition of these two solutions and care is taken to keep the sulfuric acid in excess at all times so that the slurry remains acid to Congo red paper. Upon rendering the slurry acid, the magnesium salt of the aromatic acid is converted to a fine voluminous precipitate of the water insoluble aromatic acid and the sodium silicate solution is converted to silica thereby forming the gel or sol. After the gel or sol is formed, it is then allowed to digest by standing at a temperature of from about 20° C. to 40° C. for a period of from about one-half to five hours. During this digestion period the viscosity of the gel or sol increases so as to form a thickened mixture. After digestion has been carried out, the thickened silica sol or gel is heat treated at a temperature of from 40° C. to 70° C. for a period of from one-half hour to one hour during which time there is a further increase in the viscosity of the gel and sol and the formation of an acervated structure within the silica sol or gel takes place.

The partial amide salt may then be prepared by dissolving the monoamide of hydrogenated tallow fatty acids and aminoethylethanolamine in organic liquid such as varnish makers' and painters' naphtha or any other water insoluble organic liquid so as to form a clear solution. Glacial acetic acid may then be added to this clear solution, thus forming a clear solution of monoamide acetate.

The siliceous amino compound may then be prepared by adding the partial amide salt solution and sodium silicate to the silica sol or gel. Upon this addition, the water insoluble organic acid which is present in the gel or sol is converted to its water soluble sodium salt and the siliceous amino compound is formed at the same time. During this addition, the silica sol or gel is agitated and care is taken to keep the partial amide salt solution in excess at all times to minimize the heavy gel formation.

The resulting slurry of the siliceous amino compound may then be digested by allowing it to stand at room temperature. Sulfuric acid may be added to the slurry and a sample of the slurry may be taken and filtered and sulfuric acid may be then added to the filtrate in order to determine whether substantially all of the water soluble aromatic acid salt has been converted to the water insoluble aromatic acid. If conversion is not complete, then sulfuric acid is again added to the reaction slurry until conversion is complete.

The slurry of the siliceous amino compound is then filtered, washed, dried and ground.

THE USE OF THE AROMATIC ACIDS AND THEIR WATER SOLUBLE SALTS

In preparing the silica sol or gel, a water soluble silicate salt and water insoluble aromatic acid are added to water and the aromatic acid reacts with the silicate salt to form silica which disperses in the water and the water soluble salt of the aromatic acid which dissolves in the water. Magnesium sulfate or other water soluble magnesium salts may be added to the above dispersion to convert the sodium salt of the aromatic acid into the magnesium salt, both of which are water soluble salts. By utilizing water soluble magnesium salts of water insoluble aromatic acids in preparing silica sols or gels, the conversion of fine particles of silica into a substrate containing large silica particles is enhanced and aided. The formation of the water soluble magnesium salt of the organic acid may be omitted without deleteriously effecting the final silica gel or sol. But for best results, it is preferred to form the water soluble magnesium salt of the water insoluble organic acid before the preparation of the gel or sol. By utilizing a magnesium salt the later formation of large silica acervated particles from small fine silica particles is aided.

In order to achieve the beneficial properties of this invention, it is necessary to add the fluosilicate salt of fluosilicic acid and the aromatic acid before the formation of the main portion of the silica sol or gel. After this addition, digestion of the fine silica particles at a temperature of 20° C. to 40° C. for a period of from about 0.5 to 5.0 hours followed by heat treating at a temperature of from 40° C. to 75° C. for a period of one-half hour to two hours is carried out so as to produce a gel or sol having small individual silica particles united to form acervated silica structure. By forming the sol or gel in this manner, a sol or gel is produced which imparts to the siliceous amino compound, the desired structure and particle size that is necessary to produce the thickener of this invention having the improved properties herebefore described.

In preparing the siliceous amino compound, when the siliceous amino compound is formed it must be completed under alkaline conditions if a water soluble aromatic salt is to be present at this stage of the process. By alkaline conditions we mean that the pH of the reaction slurry is above 7.0. The water soluble aromatic acid salt will not form under acid conditions as the substantially water insoluble aromatic acid will precipitate under acid conditions and will remain under these conditions. Under the alkaline conditions employed to complete the siliceous amino compound formation, the aromatic acid may be converted to its water soluble salt at the same time that the siliceous amino compound is being formed. The reaction slurry may be then digested and sulfuric acid or another suitable acid may be added to the reaction slurry to bring its pH on the acid side, that is, below 7.0. By adjusting the pH to below 7.0, the water soluble salt of the aromatic acid is converted to a fine voluminous precipitate of the aromatic acid itself and this precipitate forms in and around the siliceous amino compound particles so as to become trapped within the siliceous amino compound. The siliceous amino compound slurry is then washed, filtered and dried in the usual manner described in United States patent and copending patent application previously referred to.

When the product is filtered and dried, the trapped precipitate prevents the siliceous amino particles and silica particles from collapsing, and compacting of the particles is thereby mainly prevented. This results in a product which has greater oil thickening power, less shrinkage, and which forms fewer agglomerates during drying. However, it should be understood that the above explanation of the process and composition of our invention is theoretical only and is not to be considered as binding or as limiting the scope of this invention. It is also possible that the aromatic acid itself, for example, isophthalic acid reacts with any free amino groups which may be present. However, it is not known whether the possible amino groups of the interspersion of the isophthalic or terephthalic acid in and around the siliceous amino particles and free silica particles, if present, is responsible for the new and improved product which we obtain.

The water insoluble aromatic acids and their salts used in the process of this invention must have a melting point which must be above any of the operating temperatures of the process. The aromatic acids must be substantially water insoluble, while their salts formed in this process must be water soluble. The water soluble salts must be capable of being decomposed with an acid to form a fine, preferably voluminous precipitate in the presence of the siliceous amino compound. Exemplary of such water insoluble aromatic acids are isophthalic acid and terephthalic acid and their water soluble salts which include zinc terephthalate, magnesium terephthalate, zinc isophthalate, magnesium isophthalate, sodium terephthalate, potassium isophthalate, barium isophthalate, and the like.

The new compositions prepared according to this invention may have as much as 20 percent of the aromatic acid present based on the total weight of the aromatic acid and the calculated theoretical weight of the siliceous amino compound plus free silica, if any. There is no advantage in having more than 20 percent of the aromatic acid present; however, amounts in excess of 20% of the aromatic acid may be present if desired. We prefer to have no more than 10 percent present, as we have found that amount quite satisfactory.

PREPARATION OF THE SILICA SOL OR GEL

The silica gel or sol acts as a substrate for the siliceous amino compound which is later formed by forming the siliceous amino compound in the presence of the silica sol or gel produced by the method of this invention. This silica sol or gel acts to produce a siliceous amino compound having fine porous particles as well as a large surface area. When an aromatic acid, such as terephthalic acid is used when preparing the silica gel or sol, the use of the acid such as sulfuric acid, precipitates the aromatic acid from its water soluble salt and the aromatic acid influences the formation of fine silica particles. It will be remembered that when the aromatic acid is used, the water soluble salt of the aromatic acid is present shortly before an acid such as sulfuric acid, is added.

Subsequent to the reaction of the aromatic acid with the water soluble silicate salt, acids may be introduced to completely ensure conversion of silicate salt to colloidal silica and to precipitate the aromatic acid from its water soluble salt. Such acids preferably include carboxylic acids containing up to about 6 carbon atoms and dicarboxylic acids, and preferably mineral acids. Thus acids such as acetic acid, propionic acid, butyric acid, caproic acid, oxalic acid, hydrochloric acid, phosphoric acid and sulfuric acid are especially well suited for such use. However it will be apparent to those skilled in the art that the invention need not be limited solely to the use of these specific acids heretofore named.

When the solution of the aliphatic carboxylic or mineral acid is added to the solution of the water soluble or water dispersible silicate and the water soluble salt of the aromatic acid, the acid should always be kept in excess to assure that the aromatic acid will be formed from its water soluble salt and will influence the silica particles of the silica gel or sol towards fine particle formation and that silicon dioxide will not excessively polymerize to form solid or granular gels. It is well known that silicon dioxide polymerizes less in an acid system than in an alkaline system.

In addition, additives may be used to inhibit polymerization and thus reduce the size of the silica particles, or, if desired, to accelerate polymerization of silica in order to build up the silica particle size. For example, sodium chromate and the like may be added to the solution of the water soluble or water dispersible silicate as a polymerization inhibitor, and sodium molybdate and the like may be added as a polymerization accelerator. If desired, sodium chloride and the like may be used to keep the silica gel fluid. While the addition of such salts or acids is preferred, it is not essential and may be omitted. These as well as other additives not specifically mentioned herein are known in the art and the present invention should not be construed to be limited to such features.

The fluosilicate or fluosilicic acid should be present during the formation of the silica sol or gel and before the digestion and heat treatment of the sol or gel. If it is only present after the digestion of the sol or gel occurs, the siliceous amino compound of this invention having the aforementioned beneficial properties will not be produced.

In the process of this invention, we may use fluosilicic acid and water soluble fluosilicates such as sodium fluosilicate, potassium fluosilicate, ammonium fluosilicate, magnesium fluosilicate, manganese fluosilicate, nickel fluosilicate, aluminum fluosilicate, rubidium fluosilicate, cesium fluosilicate, silver fluosilicate, cobaltous fluosilicate, thallium fluosilicate, zinc fluosilicate, cupric fluosilicate, lithium fluosilicate, hydrazine fluosilicate, hydroxylamine fluosilicate, amine fluosilicate, and the like. Fluosilicic acid and fluosilicates and their uses are described in copending application Serial No. 86,323, filed February 1, 1961. That description is hereby incorporated in the present invention by reference.

The fluosilicic acid or fluosilicate may be present in amounts of up to about 10 percent of fluosilicic acid or fluosilicate based on the total weight of fluosilicic acid or fluosilicate, free silica, if any, and the theoretical yield of the siliceous amino compound without the aromatic acid. We have found that if it is present in amounts of more than about 10 percent by weight, then there is no change in the properties of the siliceous amino compound produced by this invention, hence making the use of above 10% unnecessary. However, amounts in excess of 10% may be utilized, if desired, without effecting the final product.

The silicate salts which we employed in preparing a silica gel or sol, and in the reaction with the partial amide salt, oxazoline salt, or other salt can be any of the various forms of sodium silicate, potassium silicate and ammonium silicate which are water soluble or substantially water soluble. Examples of useful silicate salts are sodium metasilicate, $(Na_2O:SiO_2)$, sodium orthosilicate $$(2Na_2O:SiO_2)$$

or any other water soluble sodium silicate, such as, sodium silicate having the composition $Na_2O:4SiO_2$, can be used; potassium silicate $(K_2O:SiO_2)$ and $(K_2O:3.91SiO_2)$, potassium tetrasilicate $(K_2O:4SiO_2.H_2O)$ or any other water soluble potassium silicate. The preferred products, however, are produced by reacting the partial amide salt with sodium silicate having the composition $$Na_2O:3.22SiO_2$$

Water soluble or substantially water soluble silicate salts are well known in the art and the invention is not to be construed as limited to the silicate salts disclosed above.

An organic water insoluble liquid may be used in preparing the silica gel or silica sol. When the organic water insoluble liquid is used, it should be present no later than when the siliceous amino compound is formed in order to assure optimum benefit from its use. Any organic liquid which is water insoluble or substantially water insoluble can be used in preparing the siliceous amino compounds so long as it is not decomposed under the alkaline and acid conditions of this invention. Such organic liquids if present before or during the formation of the siliceous amino compound favorably influences the fine particle formation of the siliceous amino compound and free silica. The organic water insoluble liquids which can be used in this invention are disclosed in U.S. Patent No. 3,129,178 and include: aliphatic monohydroxy alcohols such as n-butanol, hexanol, and ketones such as dibenzyl ketone, and methyl isobutyl ketone, linseed oil, carbon tetrachloride, etc. It should be understood that the use of these organic liquids is optional. That is, our invention brings about the improved results even when such liquids or not used, but generally for best results it is preferred that an organic liquid such as those mentioned above be utilized.

The digestion of the silica sol may be accomplished by allowing it to stand for from about 0.5 to 5 hours at a temperature of from 20° C. to 40° C., during which time the viscosity of the gel or sol increases and acervation of the gel or sol particles occurs. If higher temperatures than 40° C. or longer periods of time than 5 hours are utilized during the digestion period, the gel or sol thickens to such an extent that heavy granular gel particles form and the appearance of large lumps within the sol or gel structure becomes quite noticeable. If this gel is subsequently utilized in preparing a siliceous amino compound, the product will not have the fine porous particle structure as well as large surface area necessary to give the improved thickening properties of this invention. If digestion periods shorter than about 0.5 hour are utilized, the requisite formation of the acervated agglomerate and the thickening necessary to subsequently produce the siliceous amino compound of this invention is not accomplished. Temperatures lower than 20° C. may be utilized during the digestion period without any deleterious effects and in most cases using a temperature as low as −15° C. during the digestion period will produce the beneficial properties of this invention. Since additional cost is encountered in cooling the gel down to temperatures lower than 20° C., and since no enhanced beneficial properties results from utilizing temperatures of below 20° C., it is seldom necessary to utilize temperatures below 20° C.

The heat treating of the silica sol or gel is accomplished immediately after the digesting period by heating the gel or sol to a temperature of 40° C. to 80° C. for a period of from about half an hour to 5 hours or longer during which period there is further build up of the sol or gel into the acervated agglomerate of silica particles. When lower temperatures or shorter times were utilized during the heat treating period, the gel or sol which formed into acervated agglomerate of fine particles during the previous digestion period did not subsequently produce the siliceous amino compound of this invention. Additionally, it was found that little build up of the acervated agglomerate and decreased viscosity of the gel occurred when periods of less than about one-half hour and temperatures of lower than 40° C. were utilized during this heat treating period. Temperatures of greater than 80° C. and periods of greater than 4 hours may be utilized without deleteriously effecting the final product of this invention. However, no increased beneficial results in the final product occurred when periods of greater than 4 hours and temperatures greater than 80° C. were utilized, hence, making it unnecessary to utilize temperatures of greater than 80° C. and periods longer than 4 hours.

In order to produce the siliceous amino compound of this invention having increased thickening properties, it is essential that the silica gel or sol be immediately heat treated after it is digested in order that the siliceous amino compound be formed in the presence of the thick and viscous gel or sol. If the sol or gel is heated treated without first digesting, there will be no substantial build up in the viscosity of the gel or sol and the acervated agglomerates of fine particles within the gel will not be produced so as to subsequently form the siliceous amino compound of this invention. If the heat treating step is not carried out after digesting the silica sol, the substantial build up and thickening of the sol or gel that occurred during the step of digesting may be dissipated and also there will be no satisfactory build up of acervated agglomerates of small particles which is necessary to produce the improved siliceous amino compound of this invention.

The steps of digesting and heat treating may be carried out at any time after the formation of the sol or gel, while the sol or gel is acid and before the formation of the siliceous amino compound which takes place in the presence of the gel or sol. If the digestion and heat treatment step are not performed during this step of process, the requisite thickening and agglomerate formation of the sol or gel in order to produce the compound of this invention does not take place.

PREPARATION OF SILICEOUS AMINO COMPOUNDS

Generally speaking, in the preparation of the siliceous amino compounds, any water soluble or water dispersible partial amide salt may be used to react with the water soluble silicates. A large number of these salts which can be used and the method of their use are disclosed in U.S. Patent No. 2,967,828, Ihde, issued January 10, 1961. The disclosure of the above identified patent pertaining to the partial amide salts and their use in preparing a siliceous amino compound are hereby incorporated by reference in the present application. Among the partial amide salts which can be used are the following: the acetate salt of a monoamide, said monoamide having been prepared by reacting tetraethylene pentamine with hydrogenated tallow fatty acids, the acetate salt of the monoamide of behenic acid and diethylene triamine, the phosphoric acid salt of the monoamide resulting from the reaction of dichlorostearic acid with diethylene triamine, and the like. The preparation of partial amide salts in general, and other partial amide salts not specifically mentioned herein, are well known in the art and hence the present invention is not to be construed as limited to the partial amide salts enumerated above.

Any water soluble or water dispersible amine acid addition salt or quaternary ammonium salt can also be used in reaction with the water soluble silicate salts to form the siliceous amino compounds of this invention. A number of amines which can be used to form the amine acid addition salts are disclosed in patent application Serial No. 836,086, filed August 26, 1959, now U.S. Patent No. 3,129,181, April 14, 1964. Among the primary, secondary, and tertiary amines which may be used to form the acid addition salts are "Primene JM–T," which is a tertiary alkyl primary amine obtainable from Rohm and Haas Co., lauryl amine, dioctyl amine, stearylamine, tricapryl amine, methyl lauryl amine, dimethyl soya amine, diphenylamine, aniline, dimethyl aniline, dibenzylamine, β-phenylethylamine, triethyl amine, methylethylisobutylamine, diisopropylamine and the like. The amine acid addition salts can be formed by treating the amine with an acid in any known conventional manner. The manner of forming the amine acid addition salts and their use in preparing a siliceous amino compound is described in U.S. Patent No. 3,129,181. This disclosure is hereby incorporated in the present application by reference. However, the present invention is not to be construed as limited to any particular mode of preparation of the amine acid addition salts or to the particular amine acid addition salts heretofore disclosed, as amine acid addition salts and their preparations are well known in the art.

Examples of the quaternary ammonium salts which can be used in preparing the siliceous amino compounds according to the process of this invention are described in U.S. Patent No. 3,129,181. Other quaternary ammonium salts are well known in the art and may also be used even though not specifically mentioned herein. Thus the invention is not to be construed as limited to the quaternary ammonium salts hereafter disclosed. Among the quaternary ammouium salts which may be used are dimethyl dioctadecyl ammonium chloride, trimethyl soya ammonium chloride, trimethyl tallow ammonium chloride, dimethyl dicoco ammonium chloride, tetraethylammonium iodide, and the like. The manner of using the quaternary ammonium salts in preparing siliceous amino compounds are disclosed in U.S. Patent No. 3,129,181. This disclosure is hereby incorporated by reference in the present application.

In addition, oxazoline salts and imidazoline salts or mixtures thereof can also be used to react with the water soluble silicates in preparing the siliceous amino compounds according to the process of this invention. Oxazoline and imidazoline salts are well known in the art and the invention is not to be construed as limited to the oxazoline and imidazoline salts described below. Among the imidazoline and oxazoline salts which may be used are the salt of the imidazoline of two moles of stearic acid and one mole of diethylenetriamine, the salt of the oxazoline of one mole of monoethanolamine and one mole of lauric acid, and the like. Among the acids which may be used to form the salts of the imidazolines and oxazolines are, phosphoric acid, acetic acid, hydrochloric acid, sulfuric acid, and the like, and where an organic solvent is used, butyric acid, propionic acid, and the like may also be used. However, it will be apparent to those skilled in the art that the invention need not be limited solely to the use of these specific acids heretofore named.

The partial amide salt as well as the other salts, such as a quaternary ammonium salt, etc., may be formed in a separate vessel and also another aqueous solution of the water soluble or water dispersible silicate may be prepared separately. These two solutions may then be added, at the same time, to the silica gel or sol, thus preparing the siliceous amino compound.

When the siliceous amino compound is prepared, it is in the form of a slurry. The pH of the slurry at this point should be rendered alkaline up to a pH of 9.5, if it is not yet alkaline, to avoid the premature precipitation under acid conditions, of the aromatic acid. When it is desired to precipitate the aromatic acid therefrom, then the pH of the slurry can be lowered to 3.0 by means of acid addition. It has been found that for some unexplainable reason, when the aromatic acid is present, the pH of the slurry can be as low as 3.0 in some instances, or even lower, without risking decomposition of the siliceous amino compound.

In order to precipitate substantially all of the aromatic acid from its water soluble salt, the following is done. A sample of the slurry is taken and filtered. To the filtrate is then added a suitable acid. If no precipitate forms, precipitation is complete. If a precipitate forms, then more acid is added to the slurry and the procedure is repeated until no precipitate is obtained upon addition of an acid to the filtrate from a sample of the slurry.

The water insoluble organic liquid which can be used are those previously mentioned, and need not be further discussed. The water insoluble organic liquid however, can be added at any stage of the process and even after the siliceous amino compound is formed, although it is preferably added before or simultaneously with formation of the siliceous amino compound. If the organic liquid is added after both the silica and siliceous amino compound are formed, it will aid filtration and reduce aggregate formation during drying even though it has been added at a time after which it favorably influences fine particle formation.

The precise nature of the reaction of the silicate salt and the salt of the partial amide as well as the other salts, such as the amine acid addition salts, etc., is not known. It is believed that the sodium, potassium or ammonium ions of the silicate salt form a salt with the acid radicals of the partial amide salt and that the silica portion of the silicate salt combines with the amino nitrogen atoms of the partial amide reactant to produce the siliceous amino compound. However, the above theory should not be construed as limiting the scope of the invention.

In producing the siliceous amino compound, the silicate salt is employed in quantities which are at least stoichiometrically equivalent to the quantity of partial amide salt or of another salt, such as an imidazoline salt, etc., with which it is to be reacted. For the purpose of this invention, a stoichiometrically equivalent quantity is that quantity of silicate salt which will provide sufficient sodium, potassium or ammonium ions to neutralize all of the acid radicals of the partial amide salt or other salt, such as an oxazoline salt, etc. The products of the invention may be produced by using quantities of silicate salt in excess of the stoichiometrically equivalent amount. The excess silicate salt may then be converted with acid to silicon dioxide and the water soluble sodium, potassium or ammonium salts of the acid.

The silicon dioxide which is present in the siliceous amino compound is also referred to as colloidal silica and includes silica gel, silicic acid, or hydrated silica and should constitute from about 65% to 95% of the total siliceous amino compound. The silicon dioxide which is produced when the water soluble silicate salt is reacted with an aromatic acid becomes dispersed in the reaction mixture. The product that is subsequently produced from the reaction of the silicate salt and the partial amide salt is adsorbed on the silicon dioxide or complexed therewith so as to form the siliceous amino product. The water soluble sodium, potassium or ammonium salt of the acid which is produced as the incidental reaction product of this acid-treating step is soluble in the aqueous portion of the reaction medium and is removed from the water insoluble product of the invention when the product is separated from the reaction medium as for example by filtering and washing.

The preparation of these siliceous amino compounds may be carried out under atmospheric pressure using a wide range of temperature, i.e., from just above the freezing point of the highest freezing component to just below the boiling point of the lowest boiling component or azeotrope, if a water-organic liquid mixture is used. If a non-volatile organic liquid is used, the maximum temperature should be the boiling point of the water present which would be the lowest boiling component. The higher temperatures, e.g. of the order of 75° C. are preferred in order to obtain uniform distribution of the siliceous amino compound. That is, under the higher temperatures if any of the partial amide or other compounds such as quaternary ammonium compound, etc., should precipitate out as large particles, gummy masses, or small lumps, it will readily redisperse.

In order to more fully illustrate the nature of this invention and the manner of practicing the same, the following examples are presented.

*Example I*

This Example illustrates a method of preparing a siliceous amino compound without digesting or heat treating the silica sol or gel.

(A) *Preparation of the silica sol.*—3 lbs. 12 oz. of isophthalic acid and 18 lbs. of a 40° Bé. sodium silicate ($Na_2O:3.22SiO_2$) solution was dissolved in 300 lbs. of water. The resultant clear sodium isophthalic solution was diluted by the addition of 210 lbs. of water thereto. The solution was then agitated while heating to a temperature of 75° C. and diluted with an additional 150 lbs. of water.

A magnesium sulfate solution containing 3 lbs. 6 oz. of magnesium sulfate ($MgSo_4.7H_2O$) dissolved in 14.5 lbs. of water was slowly added to the solution containing sodium isophthalic acid. A cloudy slurry formed. The slurry was allowed to cool to 55° C. whereupon 852 grams of sodium fluorosilicate was dissolved therein. The slurry was then cooled to 40° C.

A dilute sulfuric acid solution prepared by adding 14 lbs. 15 oz. of 96% by weight sulfuric acid to 73 lbs. of water, was added to the cloudy slurry so that the slurry gave an acid reaction to Congo red paper. The remaining sulfuric acid solution and 57 lbs. of 40° Bé. sodium silicate ($Na_2O:3.22SiO_2$) solution diluted with 45 lbs. of water were then slowly added at the same time to the cloudy slurry in order to form the silica sol and the aromatic acid. During the addition of the two solutions the slurry was completely agitated. Care was taken to keep the sulfuric acid in excess at all times so that the slurry was acid to Congo red at all times.

(B) *Preparation of the partial amide salt.*—3 lbs. 12 oz. of the mono amide of halogenated tallow fatty acid and aminoethyl ethanol amine was dissolved in 75 lbs. of V.M. and P. Naphtha at a temperature of about 80° C. To this clear solution was then added 1 lb. 12 oz. of glacial acetic acid to form the monoamide acetate salt.

(C) *Preparation of the siliceous amino compound.*— The partial amide salt prepared above in part B and the sodium silicate dilution prepared by diluting 45 lbs. 12 oz. of a 40° Bé. sodium silicate ($Na_2O:3.22SiO_2$) solution with 45 lbs. 12 oz. of water were slowly added at the same time to the silica sol of part A. When the partial amide salt and the sodium silicate dilution were added to the silica sol, the water soluble sodium salt of isophthalic acid formed from the aromatic acid present in the silica sol dissolved, and the siliceous amino compound was formed at the same time. During this addition, the silica sol was agitated and care was taken to keep the partial amide salt solution in excess at all times to minimum heavy gel formation. The temperature of the slurry was maintained during the addition at about 55° C. The filtrate from the filtered sample of the slurry had a pH of 7.5. The pH of the slurry was then adjusted to 7.6 with 1½ lbs. of sodium hydroxide and 6 lbs. of the aforementioned sodium silicate solution. The pH of the dilution was made on the filtrate from a small filtered sample.

The slurry was digested by allowing it to stand for 17 hours without supplying heat or agitation.

50 lbs. of 10% sulfuric acid was then added to the digested slurry thereby precipitating a fine voluminous precipitate of isophthalic acid in and around the siliceous amino compound particles. The filtrate from a filtered sample of the slurry had a pH of 3.5. Upon the addition of 10% by weight sulfuric acid to this filtrate, a slight white haze developed indicating that practically all of the water soluble isophthalic salt had been converted to substantially insoluble isophthalic acid.

(D) *Recoveryy of siliceous amino compound.*—The slurry was heated with agitation to a temperature of between 85° C. to 90° C. and filtered. The filter cake was washed twice each time adding approximately 1,000 lbs. of water, agitating the slurry and filtering. The washed filter cake was dried at a temperature of 195° F. and ground in a Metals Disintegrating Company Micro-Pulverizer through a ⅟₁₆ inch screen. A yield of 32 lbs. of a finely ground material having a particle size of about 35 to 45 microns was obtained.

*Example II*

This example illustrates another method of preparing a siliceous amino compound without digesting or heat treating the silica sol.

(A) *Preparation of the silica sol.*—3.0 lbs. of isophthalic acid and 14 lbs. 6 oz. of a 40° Bé. sodium silicate ($Na_2O:3.22SiO_2$) solution were dissolved by means of agitation in 240 lbs. of water. The resultant clear sodium isophthalate solution was diluted by the addition of 170 lbs. of water thereto. The solution was then agitated while heating to a temperature of 80° C. and diluted with 220 lbs. of water.

A magnesium sulfate solution containing 2 lbs. 14 oz. of magnesium sulfate ($MgSO_4.7H_2O$) dissolved in 15 lbs. of water was slowly added to the solution containing sodium isophthalate. A cloudy slurry formed. The slurry was allowed to cool to 50° C. whereupon 1.5 lbs. of sodium fluosilicate was dissolved therein. The slurry was then cooled to 40° C.

A diluted sulfuric acid solution prepared by adding 9 lbs 2 oz. of 96% by weight sulfuric acid to 52 lbs. of water was added to the cloudy slurry until the slurry gave an acid reaction to Congo red paper. The remaining sulfuric acid solution and 45 lbs. 8 oz. of a 40° Bé. sodium silicate ($Na_2O:3.22SiO_2$) solution diluted with 45 lbs. of water, were then slowly added, at the same time, to the cloudy slurry in order to form the silica sol and the aromatic acid. During the addition of the two solutions to the slurry, the slurry was constantly agitated. Care was taken to keep the sulfuric acid in excess at all times so that the slurry was acid to Congo red paper at all times. Upon completion of this addition, the milky slurry was heated with agitation to 55° C.

(B) *Preparation of the partial amide salt.*—3.0 lbs. of the monoamide of hydrogenated tallow fatty acids and aminoethylethanolamine was dissolved in 60 lbs. of varnish makers' and painters' naphtha at a temperature of from 80° C. to 85° C. To this clear solution was then added 382 grams of glacial acetic acid thus forming a clear solution of monoamide acetate.

(C) *Preparation of the siliceous amino compound.*— The partial amide salt solution prepared above in part B and a sodium silicate dilution prepared by diluting 36 lbs. 9 oz. of a 40° Bé. sodium silicate ($Na_2O:3.22Si_2O$) solution with 40 lbs. of water, were slowly added at the same time to the silica sol of part A. When the partial amide salt solution and the sodium silicate dilution were added to the silica sol, the water soluble sodium salt of isophthalic acid formed from the aromatic acid present in the silica sol dissolved, and the siliceous amino compound was formed at the same time. During this addition, the silica sol was agitated and care was taken to keep the partial amide salt solution in excess at all times to minimize heavy gel formation. The temperature of the slurry was maintained between 61° C. and 64° C. during the addition. The filtrate from a filtered sample of the slurry had a pH of 7.5.

The slurry was digested by allowing it to stand for eighteen hours without supplying heat or agitation.

30 lbs. of 10% sulfuric acid was then added to the digested slurry thereby precipitating a fine voluminous precipitate of isophthalic acid in and around the siliceous amino compound particles. The filtrate from a filtered sample of the slurry had a pH of 3.8. Upon addition of 10% sulfuric acid to this filtrate, a slight white haze developed indicating that practically all of the water soluble isophthalate salt had been converted to the substantially insoluble isophthalic acid.

(D) *Recovery of the siliceous amino compound.*—The slurry was heated with agitation to a temperature of 70° C. and filtered. The filter cake was washed four times, each time adding 700 lbs. of water, agitating the slurry, and filtering. The washed filter cake was dried at a temperature of 165° F. and ground in a Metals Disintegrating Company Micro-Pulverizer through a ⅟₁₆″ screen. A yield of 28 lbs. of a finely ground material having a particle size of about 30 to 45 microns was obtained.

*Example III*

This example is directed to a method of producing siliceous amino compounds whereby the silica sol is digeted for 1¼ hours at 60° C. and further treated by heating to 60° C. for ¼ hour (which is below the time required for producing the product of this invention) before the formation of the siliceous amino compound.

(A) *Preparation of the silica sol.*—3 lbs. 12 oz. of isophthalic acid and 18 lbs. of a 40° Bé. sodium silicate ($Na_2O:3.22SiO_2$) solution was dissolved in 300 lbs. of water. The resultant clear sodium isophthalic solution was diluted by the addition of 210 lbs. of water thereto. The solution was then agitated while heating to a temperature of 75° C. and diluted with an additional 150 lbs. of water.

A magnesium sulfate solution containing 3 lbs. 6 oz. of magnesium sulfate ($MgSO_4.7H_2O$) dissolved in 14.5 lbs. of water was slowly added to the solution containing sodium isophthalic acid. A cloudy slurry formed. The slurry was allowed to cool to 55° C. whereupon 852 grams of sodium fluosilicate was dissolved therein. The slurry was then cooled to 40° C.

A dilute sulfuric acid solution prepared by adding 14 lbs. 15 oz. of 96% by weight sulfuric acid to 73 lbs. of water, was added to the cloudy slurry so that the slurry gave an acid reaction to Congo red paper. The remaining sulfuric acid solution and 57 lbs. of 40° Bé. sodium silicate ($Na_2O:3.22SiO_2$) solution diluted with 45 lbs. of water was then slowly added at the same time to the cloudy slurry in order to form the silica sol and the aromatic acid. During the addition of the two solutions the slurry was completely agtiated. Care was taken to keep the sulfuric acid in excess at all times so that the slurry was acid to Congo red at all times.

After the slurry was acidified it was digested by allowing it to stand without agitation for 1¼ hours at 60° C. After this period, the slurry was heated to 60° C. This temperature was maintained for ¼ hour.

The partial amide salt, the preparation of the siliceous amino compound and the recovery of the siliceous amino compound was carried out by the exact procedure of parts B, C and D of Example I. A yield of 32 lbs. of a finely ground material having a particle size of about 25 to 35 microns was obtained.

*Example IV*

This example is directed to a method of producing siliceous amino compounds whereby the silica sol was digested for 1½ hours at 40° C. and further treated by heating to 60° C. for ½ hour before the formation of the siliceous amino compound.

(A) *Preparation of the silica sol.*—3 lbs. 12 oz. of isophthalic acid and 18 lbs. of a 40° Bé. sodium silicate ($Na_2O:3.22SiO_2$) solution was dissolved in 300 lbs. of water. The resultant clear sodium isophthalic solution was diluted by the addition of 210 lbs. of water thereto. The solution was then agitated while heating to a temperature of 75° C. and diluted with an additional 150 lbs. of water.

A magnesium sulfate solution containing 3 lbs. 6 oz. of magnesium sulfate ($MgSO_4.7H_2O$) dissolved in 14.5 lbs. of water was slowly added to the solution containing sodium isophthalic acid. A cloudy slurry formed. The slurry was allowed to cool to 55° C. whereupon 852 grams of sodium fluosilicate was dissolved therein. The slurry was then cooled to 40° C.

A dilute sulfuric acid solution prepared by adding 14 lbs. 15 oz. of 96% sulfuric acid to 73 lbs. of water, was added to the cloudy slurry so that the slurry gave an acid reaction to Congo red paper. The remaining sulfuric acid solution and 57 lbs. of 40° Bé. soduim silicate ($Na_2O:3.22SiO_2$)

solution diluted with 45 lbs. of water were then slowly added at the same time to the cloudy slurry in order to form the silica sol and the aromatic acid. During the addition of the two solutions the slurry was completely agitated. Care was taken to keep the sulfuric acid in excess at all times so that the slurry was acid to Congo red at all times.

After the slurry was acidified it was digested by allowing it to stand without agitation for 1½ hours at 40° C. After this period, the slurry was immediately heated to 60° C. This temperature was maintained for 1½ hours.

The preparation of the partial amide salt, the preparation of the siliceous amino compound and the recovery of the siliceous amino compound was carried out by the exact procedure of parts B, C and D of Example I. A yield of 32 lbs. of a finely ground material having a particle size of about 10 to 15 microns was obtained.

*Example V*

This example illustrates a method of preparing a siliceous amino compound whereby the silica sol was digested and heat treated before the formation of the siliceous amino compound.

(A) *Preparation of the silica sol.*—3.0 lbs. of isophthalic acid and 14 lbs. 6 oz. of a 40° Bé. Sodium silicate ($Na_2O:3.22SiO_2$) solution were dissolved in 240 lbs. of water. The resultant clear sodium isophthalate solution was diluted by the addition of 170 lbs. of water thereto. The solution was then agitated while heating to a temperature of 80° C. and diluted with 220 lbs. of water.

A magnesium sulfate solution containing 2 lbs. 14 oz. of magnesium sulfate ($Mg.SO_4.7H_2O$) dissolved in 15 lbs. of water, was slowly added to the solution containing sodium isophthalate. A cloudy slurry formed. The slurry was allowed to cool to 50° C. whereupon 1.5 lbs. of sodium fluosilicate was dissolved therein. The slurry was then cooled to 40° C.

A diluted sulfuric acid solution prepared by adding 9 lbs. 2 oz. of 96% by weight sulfuric acid to 52 lbs. of water was added to the cloudy slurry until the slurry gave an acid reaction to Congo red paper. The remaining sulfuric acid solution and 45 lbs. 8 oz. of a 40° Bé. sodium silicate ($Na_2O:3.22SiO_2$) solution diluted with 45 lbs. of water, were then slowly added, at the same time, to the cloudy slurry in order to form the silica sol and the aromatic acid. During the addition of the two solutions to the slurry, the slurry was constantly agitated. Care was taken to keep the sulfuric acid in excess at all times so that the slurry was acid to Congo red paper at all times. Upon completion of this addition, the milky slurry was heated with agitation to 55° C. The cloudy slurry after being made acid was digested by allowing it to stand without agitation for two hours at 40° C. After this period the slurry was then treated by heating to a temperature of about 60° C. This temperature was maintained for a period of ½ hour.

(B) *Preparation of the partial amide salt.*—3 lbs. of the monoamide of halogenated tallow fatty acid and aminoethylethanolamine was dissolved in 60 lbs. of varnish makers' and painters' naphtha at a temperature of from 80° C. to 85° C. To this clear solution was then added 283 grams of glacial acetic acid thus forming a clear solution of the monoamide acetate.

(C) *Preparation of the siliceous amino compound.*—The partial amide solution prepared above in part B and the sodium silicate dilution prepared by diluting 36 lbs. 9 oz. of a 45° Bé. sodium silicate ($Na_2O:3.22SiO_2$) solution with 40 lbs. of water, were slowly added at the same time to the silica sol of part A was added at a temperature of 60° C. When the partial amide salt solution and the sodium silicate dilution were added to the silica sol, the water soluble sodium salt of isophthalic acid formed from the aromatic acid present in the silica sol, dissolved and the siliceous amino compound was formed at the same time. During this addition the silica sol was agitated and care was taken to keep the partial amide salt solution in excess at all times to minimize the gel formation. The temperature of the slurry was maintained during the addition at about 60° C. The filtrate from the filtered sample of the slurry had a pH of 7.5. The slurry was digested by allowing it to stand for eighteen hours without supplying heat or agitation.

30 lbs. of 10% sulfuric acid was then added to the digested slurry thereby precipitating a fine voluminous precipitate of isophthalic acid in and around the siliceous amino compound particles. The filtrate from a filtered sample of the slurry had a pH of 3.8. Upon addition of 10% sulfuric acid to this filtrate, a slight white haze developed indicating that practically all of the water soluble isophthalate salt had been converted to the substantially insoluble isophthalic acid.

The siliceous amino compound was recovered by the exact manner of part D of Example II. A yield of 28 lbs. of finely ground material having a particle size of about 10 to 15 microns was obtained.

Example VI

This example illustrates a method of preparing a siliceous amino compound whereby the silica sol was digested and heat treated according to this invention before the formation of the siliceous amino compound.

(A) *Preparation of the silica sol.*—3.0 lbs. of isophthalic acid and 14 lbs. 6 oz. of a 40° Bé. sodium silicate ($Na_2O:3.22SiO_2$) solution were dissolved in 240 lbs. of water. The resultant clear sodium isophthalate solution was diluted by the addition of 170 lbs. of water thereto. The solution was then agitated to a temperature of 80° C. and diluted with 220 lbs. of water.

A magnesium sulfate solution containing 2 lbs. 14 oz. of magnesium sulfate ($MgSO_4.7H_2O$) dissolved in 15 lbs. of water was slowly added to the solution containing sodium isophthalate. A cloudy slurry formed. The slurry was allowed to cool to 50° C. whereupon 1.5 lbs. of sodium fluosilicate was dissolved therein. The slurry was then cooled to 40° C.

A diluted sulfuric acid solution, prepared by adding 9 lbs. 2 oz. of 96% sulphuric acid to 52 lbs. of water, was added to the cloudy slurry until the slurry gave an acid reaction to Congo red paper. The remaining sulfuric acid solution and 45 lbs. 8 oz. of a 40° Bé. sodium silicate ($Na_2O:3.22SiO_2$) solution diluted with 45 lbs. of water, were then slowly added, at the same time, to the cloudy slurry in order to form the silica sol and the aromatic acid. During the addition of the two solutions to the slurry, the slurry was constantly agitated. Care was taken to keep the sulfuric acid in excess at all times so that the slurry was acid to Congo red paper at all times. Upon completion of this addition, the milky slurry was heated to 55° C. while agitating. The cloudy slurry after being made acid was digested by allowing it to stand without agitation for 1½ hours at 40° C. After this period the slurry was then treated by heating to a temperature of about 60° C. This temperature was maintained for ½ hour.

(B) *Preparation of the partial amide salt.*—3 lbs. of the monoamide of halogenated tallow fatty acid and aminoethylethanolamine was dissolved in 60 lbs. varnish makers' and painters' naphtha at a temperature of from 80° C. to 85° C. To this clear solution was then added 283 grams of glacial acetic acid thus forming a clear solution of the monoamide acetate.

(C) *Preparation of the siliceous amino compound.*—The partial amide solution prepared above in part B and the sodium silicate dilution prepared by diluting 36 lbs. 9 oz. of a 40° Bé. sodium silicate ($Na_2O:3.22SiO_2$) solution with 40 lbs. of water, were slowly added at the same time to the silica sol of part A at a temperature of 60° C. When the partial amide salt solution and the sodium silicate dilution were added to the silica sol, the water soluble sodium salt of isophthalic acid formed from the aromatic acid present in the silica sol, dissolved and the siliceous amino compound was formed at the same time. During this addition, the silica sol was agitated and care was taken to keep the partial amide salt solution in excess at all times to minimize the gel formation. The temperature of the slurry was maintained during the addition at about 60° C. The filtrate from the filtered sample of the slurry had a pH of 7.5. The slurry was digested by allowing it to stand for eighteen hours without supplying heat or agitation.

30 lbs. of 10% sulfuric acid was then added to the digested slurry thereby precipitating a fine voluminous precipitate of isophthalic acid in and around the siliceous amino compound particles. The filtrate from a filtered sample of the slurry had a pH of 3.8. Upon addition of 10% sulfuric acid to this filtrate, a slight white haze developed indicating that practically all of the water soluble isophthalate salt had been converted to the substantially insoluble isophthalic acid.

The siliceous amino compound was recovered by the exact manner of part D of Example II. A yield of 28 lbs. of finely ground material was obtained having a particle size of about 10 to 15 microns.

Example VII

In this example the viscosity and grease penetration of the various samples prepared by Examples I through VI were determined.

The efficiency of the siliceous amino products prepared by means of Examples I to VI, as thickening agents, was tested by dispersing 5 gram portions of each of the materials prepared in Examples I to VI into 200 grams of 320 seconds Saybolt viscosity naphthenic base oil at room temperature. The viscosity was determined by means of A.S.T.M. D8838.

The grease penetrations of the individual samples were determined with a penetrometer by means of an A.S.T.M D5 and D217. Where penetration values are given, unless otherwise indicated, the grease was composed of 9% siliceous amino compound and 91% oil based on the total weight of the grease. It should be noted that the lower the penetration value is the harder the grease is. Also, the harder the grease, in greases containing an equal percentage of siliceous amino compound, the finer the particles will be, and/or the more porous are the particle aggregates of the siliceous amino compound.

The results of the viscosity and grease penetration tests are tabulated in Table I.

TABLE I

| Example No. | Silica Sol Digested | Heat Treated | Brookfield Viscosity | Grease Penetration |
|---|---|---|---|---|
| I | No | No | 58,800 | 420+ |
| II | No | No | 41,600 | 420+ |
| III | 1¼ hours | ¼ hour | 125,000 | 420+ |
| IV | 1½ hours | ½ hour | 176,000 | 350 |
| V | 2 hours | ½ hour | 220,000 | 348 |
| VI | 1½ hours | ½ hour | 150,000 | 380 |

From the foregoing table it can be seen that the silica sols prepared by digesting and heat treating when utilized as thickening agents produce a viscosity of at least twice as much as where no digesting or heat treating of the silica sol or gel occurred. The grease penetration value for those siliceous amino compounds prepared according to Examples IV, V and VI where digesting and heat treating were carried out for the necessary amount of time were lower than that of Examples I, II and III wherein heat treating and digestion were omitted or not carried out for the proper amount of time. This showed that siliceous amino compounds prepared by heat treating and digesting the silica sol in the preparation of the siliceous amino compound when added to oil produces a harder and more viscous oil than that produced by the siliceous amino compounds prepared without heat treating or digesting the sol.

Example VIII

The samples prepared by the exact manner outlined in Example VII were jet milled in order to produce a particle size in the range of about 0.25 to 1 micron and the viscosity and grease penetration were determined by the methods outlined in Example VII. The results are tabulated in Table II.

TABLE II

| Example No. | Brookfield Viscosity | Grease Penetration |
| --- | --- | --- |
| III | 224,000 | 345 |
| IV | 560,000 | 260 |
| V | 524,000 | 300 |
| VI | 560,000 | 280 |

A comparison of the results of Tables I and II shows that jet milling appreciably increases the oil thickening power as well as the power to inhibit grease penetration of the siliceous amino compounds prepared by digesting and heat treating the sol before the formation of the siliceous amino compound is appreciably increased. The results also indicate that a silica sol heat treated for only ¼ of an hour after digesting for a sufficient period of time (Example III) does not have the property of increasing the oil thickening properties or decreasing the grease penetration of the oil to as great an amount as that of Examples IV, V and VI wherein digestion and heat treatment of the silica sol are carried out for a sufficient period of time. By jet milling, the differences between the thickening properties and the grease penetration of siliceous amino compounds prepared by digesting and heat treating the sol for a sufficient period of time as compared to the siliceous amino compounds prepared by heat treating for an insufficient amount of time are seen more clearly as shown by a comparison of Tables I and II.

Having described our invention, what we claim is new and desire to secure by Letters Patent is:

1. A process for preparing an improved siliceous amino compound comprising (1) reacting a water soluble silicate salt with a water soluble acid being selected from the group consisting of mineral acids and carboxylic acids, in water containing dissolved therein a water soluble salt of an aromatic acid selected from the group consisting of isophthalic acid, terephthalic acid and the aromatic acid of said salt so as to form a silica gel, (2) digesting said gel by allowing it to stand at a temperature of from about −15° C. to 40° C. for a period of from about one-half to five hours, (3) heating said digested gel to a temperature of from about 40° C. to 80° C. for a period of from one-half hour to five hours, (4) thereafter reacting in said gel, a material selected from the class consisting of water-soluble inorganic acid salts of aliphatic partial amides, water-dispersible inorganic acid salts of aliphatic partial amides, water-soluble inorganic acid addition salts of aliphatic amines, water-dispersible inorganic acid addition salts of aliphatic amines, water-dispersible inorganic acid addition salts of an amine containing at least one benzene ring, water-soluble inorganic acid addition salts of an amine containing at least one benzene ring, water-soluble inorganic acid salts of imidazolines, water-dispersible inorganic acid salts of imidazolines, water-soluble inorganic acid salts of oxazolines, water-dispersible inorganic acid salts of oxazolines, water-soluble organic quaternary ammonium salts and water-dispersible organic quaternary ammonium salts with at least a stoichiometric equivalent of a water soluble silicate salt selected from the class consisting of sodium silicate, potassium silicate and ammonium silicate so as to form said siliceous amino compound and said water soluble aromatic salt.

2. A process according to claim 1 wherein said water soluble aromatic salt is treated with an acid after the formation of a siliceous amino compound thereby precipitating said aromatic acid in and around the siliceous amino compound particles.

3. Process according to claim 1 wherein there is present a silicate derivative consisting of water soluble fluosilicate salts and fluosilicic acid, said silicate derivative being present at the time of formation of said silica gel.

4. A process according to claim 1 wherein said material and said water soluble silicate salts are reacted in said gel containing a substantially water insoluble organic compound, said compound being liquid at the operating temperatures of the process.

5. A new improved thickening agent, said thickening agent prepared by (1) reacting a water soluble silicate salt with a water soluble acid selected from the group consisting of mineral acids and carboxylic acids, in water containing dissolved therein a water soluble salt of an aromatic acid selected from the group consisting of isophthalic acid, terephthalic acid and so as to form a silica gel, (2) digesting said gel by allowing it to stand at a temperature of from about −15° C. to 40° C. for a period of between about one to five hours, (3) heating said digested gel to a temperature of from about 40° C. to 80° C. for a period of from one-half hour to five hours, (4) thereafter reacting in said gel a material selected from the class consisting of water-soluble inorganic acid salts of aliphatic partial amides, water-dispersible inorganic acid salts of aliphatic partial amides, water-soluble inorganic acid addition salts of an amine containing at least one benzene ring, water-dispersible inorganic acid addition salts of an amine containing at least one benzene ring, water-soluble inorganic acid addition salts of an aliphatic amine, water-dispersible inorganic acid addition salts of an aliphatic amine, water-soluble inorganic acid salts of imidazolines, water-dispersible inorganic acid salts of imidazolines, water-soluble inorganic acid salts of oxazolines, water-dispersible inorganic acid salts of oxazolines, water-soluble organic quaternary ammonium salts, and water-dispersible organic quaternary ammonium salts with at least a stoichiometric equivalent of a water soluble silicate salt selected from the class consisting of sodium silicate, potassium silicate and ammonium silicate to form particles of a siliceous amino compound.

6. The thickening agent according to claim 5 wherein said water soluble aromatic salt is treated with an acid after the formation of a siliceous amino compound thereby precipitating said aromatic acid in and around the siliceous amino compound particles.

7. The thickening agent according to claim 5 wherein there is present a silicate derivative consisting of water soluble fluosilicate salts and fluosilicic acid, said silicate derivative being present at the time of formation of said silica gel.

8. The thickening agent according to claim 5 wherein said material and said water soluble silicate salts are reacted in said gel containing a substantially water insoluble organic compound said compound being liquid at the operating temperatures of the process.

References Cited by the Examiner

UNITED STATES PATENTS 2,967,828   1/61   Ihde _____ 252—28

DANIEL E. WYMAN, *Primary Examiner.*